(12) United States Patent
McIntosh

(10) Patent No.: US 7,220,907 B2
(45) Date of Patent: May 22, 2007

(54) DATA RECORDING AND RETRIEVAL, SHEET MUSIC, MUSIC KEYBOARD TABLATURE AND METHOD OF TEACHING MUSIC

(76) Inventor: Leigh Lachlan McIntosh, 176 Thomas Street, Brighton East, Victoria (AU)

( * ) Notice: Subject to any disclaimer, the term of this patent is extended or adjusted under 35 U.S.C. 154(b) by 851 days.

(21) Appl. No.: 10/363,083

(22) PCT Filed: Aug. 30, 2001

(86) PCT No.: PCT/AU01/01088

§ 371 (c)(1),
(2), (4) Date: Feb. 27, 2003

(87) PCT Pub. No.: WO02/19315

PCT Pub. Date: Mar. 7, 2002

(65) Prior Publication Data

US 2004/0020347 A1    Feb. 5, 2004

(30) Foreign Application Priority Data

Aug. 31, 2000  (AU) ..................................... PQ 9823

(51) Int. Cl.
*G10H 1/00* (2006.01)
(52) U.S. Cl. .................................. 84/477 R; 84/470 R
(58) Field of Classification Search .............. 84/477 R, 84/470 R
See application file for complete search history.

(56) References Cited

U.S. PATENT DOCUMENTS

| 1,473,495 | A |   | 11/1923 | Miller |
|---|---|---|---|---|
| 2,157,168 | A |   | 5/1939 | Fine |
| 5,783,764 | A | * | 7/1998 | Amar ....................... 84/479 A |
| 5,997,306 | A | * | 12/1999 | Delphonse .................. 434/236 |

FOREIGN PATENT DOCUMENTS

| AU | 14944/95 | 9/1996 |
|---|---|---|
| GB | 2 090 041 | 6/1982 |
| WO | 94/17506 | 8/1994 |

* cited by examiner

*Primary Examiner*—Lincoln Donovan
*Assistant Examiner*—Jianchun Qin
(74) *Attorney, Agent, or Firm*—Smith-Hill & Bedell

(57) ABSTRACT

The present invention comprises a method of instructing a performer on the hand manipulations to make to play a piece of music. The invention includes a representation. The representation includes at least one time line which represents the elapse of time during the piece of music. Each time line is marked with beat indicia which indicate on the time line the occurrence of a beat in the music and indicia which mark the transition between bars. Symbols carry instructions on where the fingers are to be placed to define "home" keys, and other symbols carry instructions as to which fingers are to strike a key during a beat.

19 Claims, 22 Drawing Sheets

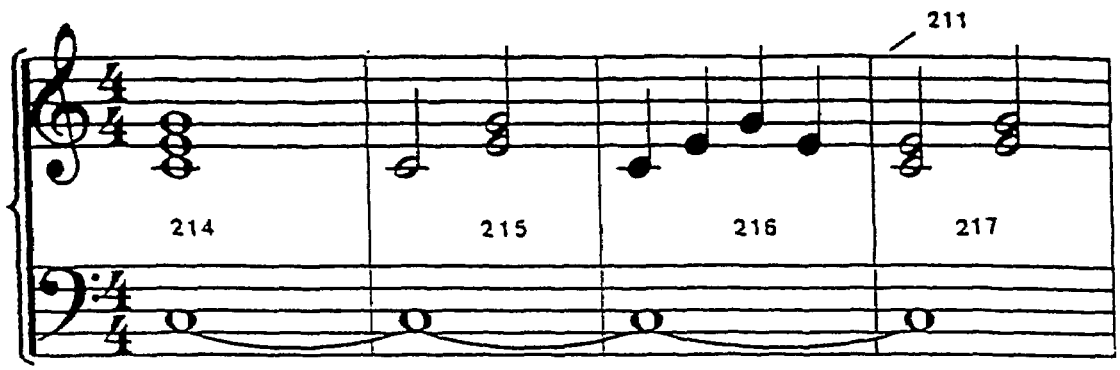
*FIGURE 12*
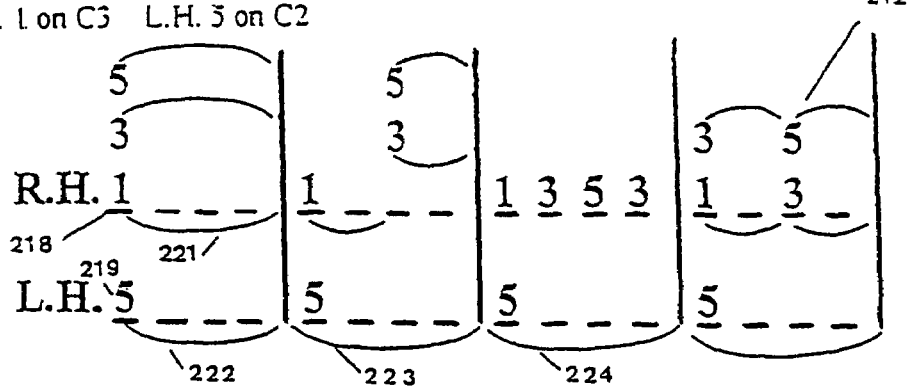
*FIGURE 13*
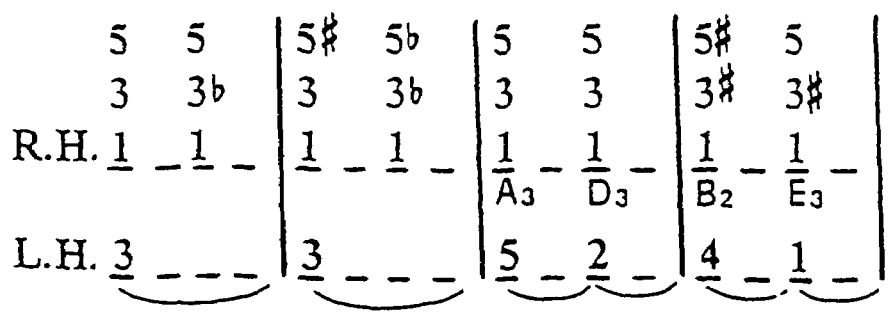

FIGURE 18
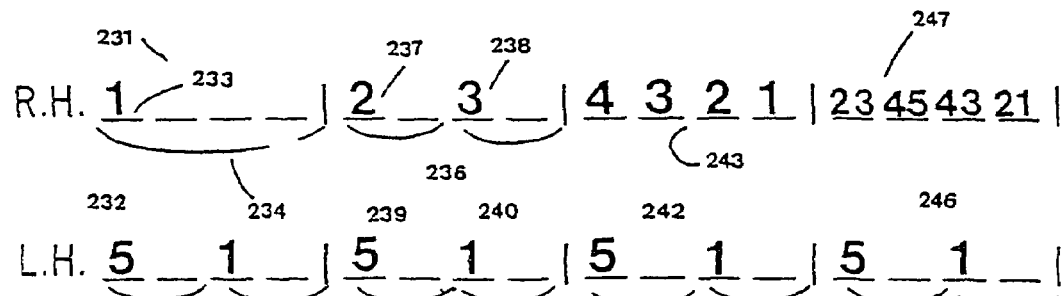
FIGURE 19
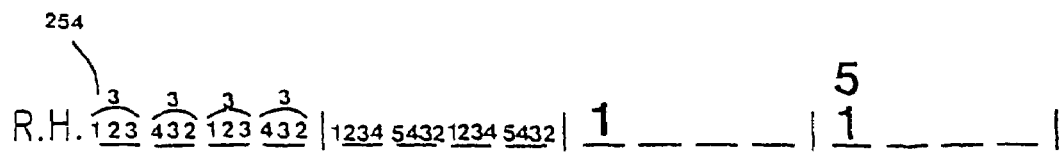

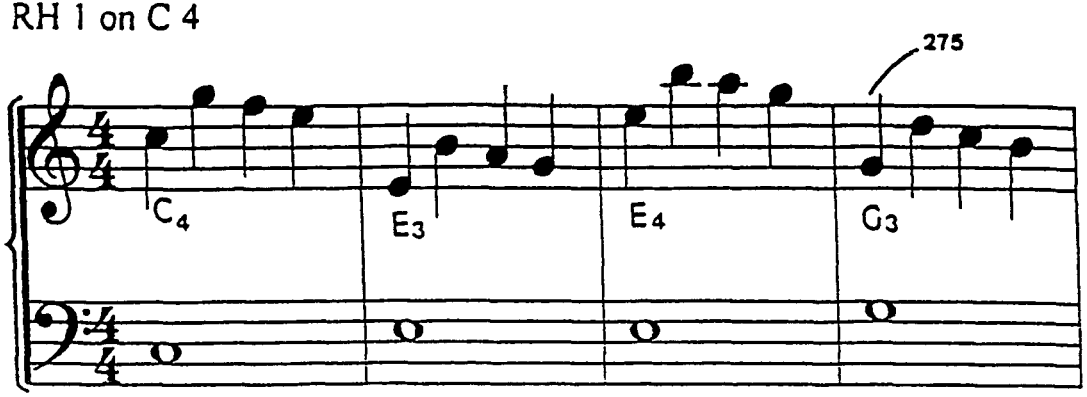
FIGURE 24
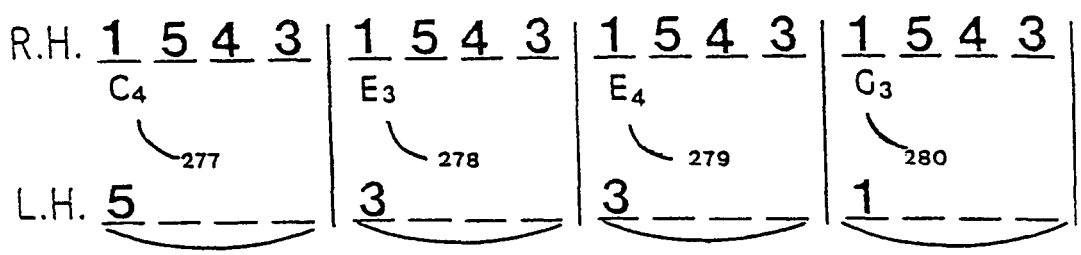
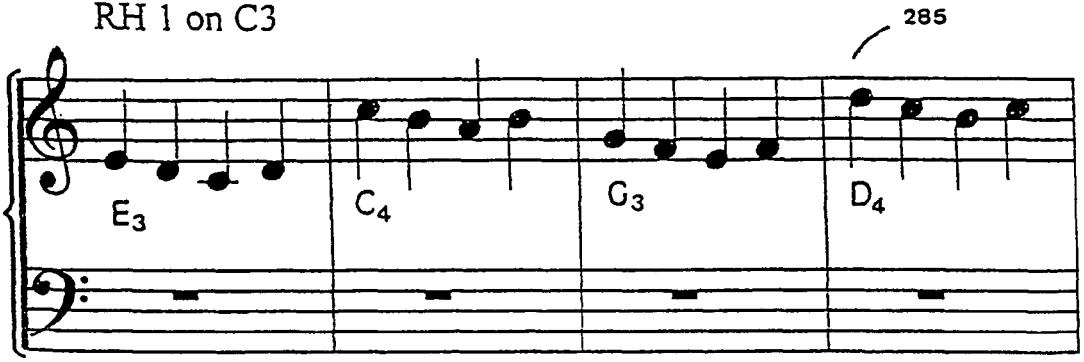
FIGURE 25
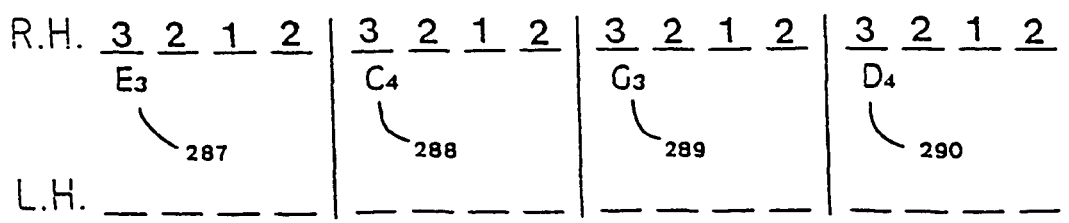

FIGURE 29

DATA RECORDING AND RETRIEVAL, SHEET MUSIC, MUSIC KEYBOARD TABLATURE AND METHOD OF TEACHING MUSIC

CROSS-REFERENCE TO RELATED APPLICATION

This is a national stage application filed under 35 USC 371 based on International Application No. PCT/AU2001/001088 tiled Aug. 30, 2001, and claims priority under 35 USC 119 of Australian Patent Application No. PQ 9823 filed Aug. 31, 2000.

TECHNICAL FIELD OF THE INVENTION

The present invention relates to recording and retrieval of data, to keyboard music and to a method of teaching keyboard instruments.

BACKGROUND ART

The traditional musical notational system for Western music developed in Europe from the work of a monk named Guido d' Arezzo (Guido of Arezzo).

That notational system conveys information about the melody, rhythm and harmony of a piece of music which has been written within the convention of the grand staff.

Guido d' Arezzo was motivated primarily to find an unambiguous method of writing down the musical sound content of Gregorian chants. He was developing a notational system which was to be used by vocalists, not by instrumentalists.

Instrumentalists, unlike vocalists, produce music by the physical manipulation of a musical instrument. A trained musician can derive those physical manipulations from the information that is contained within the conventional notation. For example, a pianist can read a piece of music in the conventional notation and decide which finger to use on which key of the keyboard to play each note.

The translation of music in conventional notation into manipulation of the keyboard requires a high degree of skill, which is not easy to acquire. The translation can also, in some respects, be ambiguous.

Historically there have been some forms of tablature for keyboard and string instruments which set out some information about the physical manipulations of the instrument which should take place to play a piece of music. These forms of tablature have, however, been developed as 'memory joggers' for musicians who either already knew the music or who would be using the tablature together with the conventional notation for the piece of music.

It is accordingly an aim of the present invention to provide a representation of a piece of music which serves primarily as a set of instructions on the physical manipulations which a performer is to perform in playing a piece of keyboard music. It is a particular aim to provide such instructions precisely and unambiguously.

It is a further aim of the present invention to provide a medium for the storage and retrieval of data. In particular, it is an aim of the invention to provide such a medium for which the data is a piece of music.

SUMMARY OF THE INVENTION

The present invention accordingly provides a representation of a piece of music which may be played by a performer on a keyboard, which representation includes:
  at least one time line which represents the elapse of time during the piece of music, and wherein there is associated with each time line:
    beat indicia which indicate points in time on the time line; and
    associated with each beat indicia, indicia of which fingers, if any, are to play a note on the keyboard.

The present invention also provides a method of instructing a performer on the manual movements to make in playing a piece of music, which method includes providing:
  at least one time line which represents the elapse of time during the piece of music, and wherein there is associated with each time line:
    beat indicia which indicate points in time on the time line; and
    associated with each beat indicia, indicia of which fingers, if any, are to play a note on the keyboard.

PREFERRED FEATURES OF THE INVENTION

It is preferred that there are two such time lines, one corresponding to each hand of the performer.

It is further preferred that there be indicia which indicate the beginning of each bar.

It is further preferred that the representation includes information which instructs the performer as to which keys of the keyboard are to be treated as home keys where performers are to rest their fingers when not playing a note. It is particularly preferred that the representation includes information which instructs the performer to change the home keys during the playing of the piece of music.

It is further preferred that the representation is used in conjunction with a keyboard which is marked to indicate the home positions of at least one finger of each hand. It is particularly preferred that the keys of the keyboard which play middle C, and the note one octave lower in pitch than middle C, be marked. It is further particularly preferred that each key which plays a 'C' note is marked.

It is further preferred that the representation includes indicia which indicate the movement that a finger is to make to strike a key other than the home key for that finger.

It is further preferred that the representation includes indicia which indicate movement that the entire hand is to make so that a finger may strike a key other than the home key for that finger.

It is further preferred that the representation includes indicia which indicate the movement that the entire hand is to make so that the fingers can strike a key other than the home 'C' keys for that hand.

It is further preferred that the representation includes indicia, associated with the beat indicia, indicating when each note is to be played relative to the beat indicia.

It is further preferred that the representation includes indicia which indicate the length of each note.

BRIEF DESCRIPTION OF THE DRAWINGS

FIGS. 3 to 27 are schematic representations of the relationship between the traditional system of musical notation and the present system of keyboard musical tablature for various types of note combinations.

FIG. 29 is a sample page as seen by a learner.

Preferred embodiments of the invention are described with reference to the drawings.

DESCRIPTION OF PREFERRED EMBODIMENTS OF THE DRAWINGS

Figure 1:
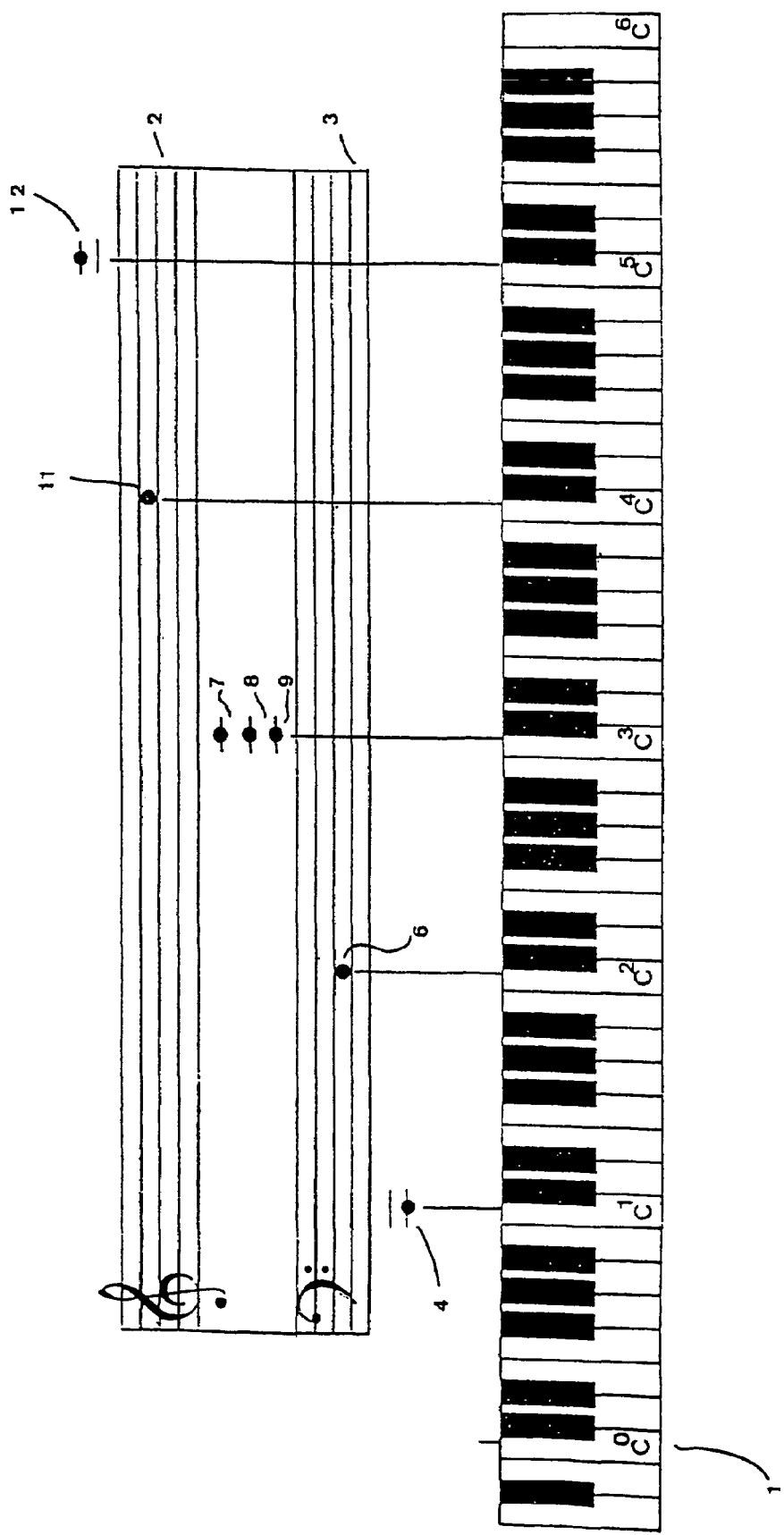
FIG. 1 represents a relationship between the conventional system of music notation and a four octave musical keyboard.

The lower portion of FIG. 1 shows a four octave portion of a music keyboard 1. The portion of the keyboard 1 which is illustrated spans four octaves of pitch Five of the keys are marked, in the drawing only, as follows:

$C_1$ and which plays a note which is two octaves in pitch below middle C;

$C_2$ and which plays a note which is one octave in pitch below middle C;

$C_3$ and which plays the note which is known as middle C;

$C_4$ and which plays the note which is one octave in pitch above middle C; and $C_5$ and which plays a note which is two octaves in pitch above middle C.

It is to be understood that the convention described above differs from the piano tuners' convention for identifying the keys of a standard seven octave piano keyboard.

The upper portion of FIG. 1 shows the treble stave 2 and the bass stave 3 of the traditional musical notation system. The vertical positioning of a note relative to the treble stave 2 indicates the pitch of a note which is to be played with the right hand. Similarly, the vertical positioning of a note relative to the bass stave 3 indicates the pitch of a note which is to be played with the left hand.

FIG. 1 shows the relationship between:
the vertical spacing of notes relative to the staves; and
the key of the keyboard which plays that note.

A note which is printed at the vertical position 4 relative to the bass stave is played by striking the key which is marked $C_1$ on the representation of the keyboard 1. A note which is printed at the vertical position 6 on the bass stave 3 corresponds to the key $C_2$ on the keyboard. The note which can be printed at any one of the three vertical positions shown as 7, 8 and 9 is middle C and corresponds to the key $C_3$ on the keyboard. Similarly, the notes which are printed at positions 11 and 12 on or relative to the treble stave correspond to the keys marked $C_4$ and $C_5$ on the keyboard.

Figure 2:
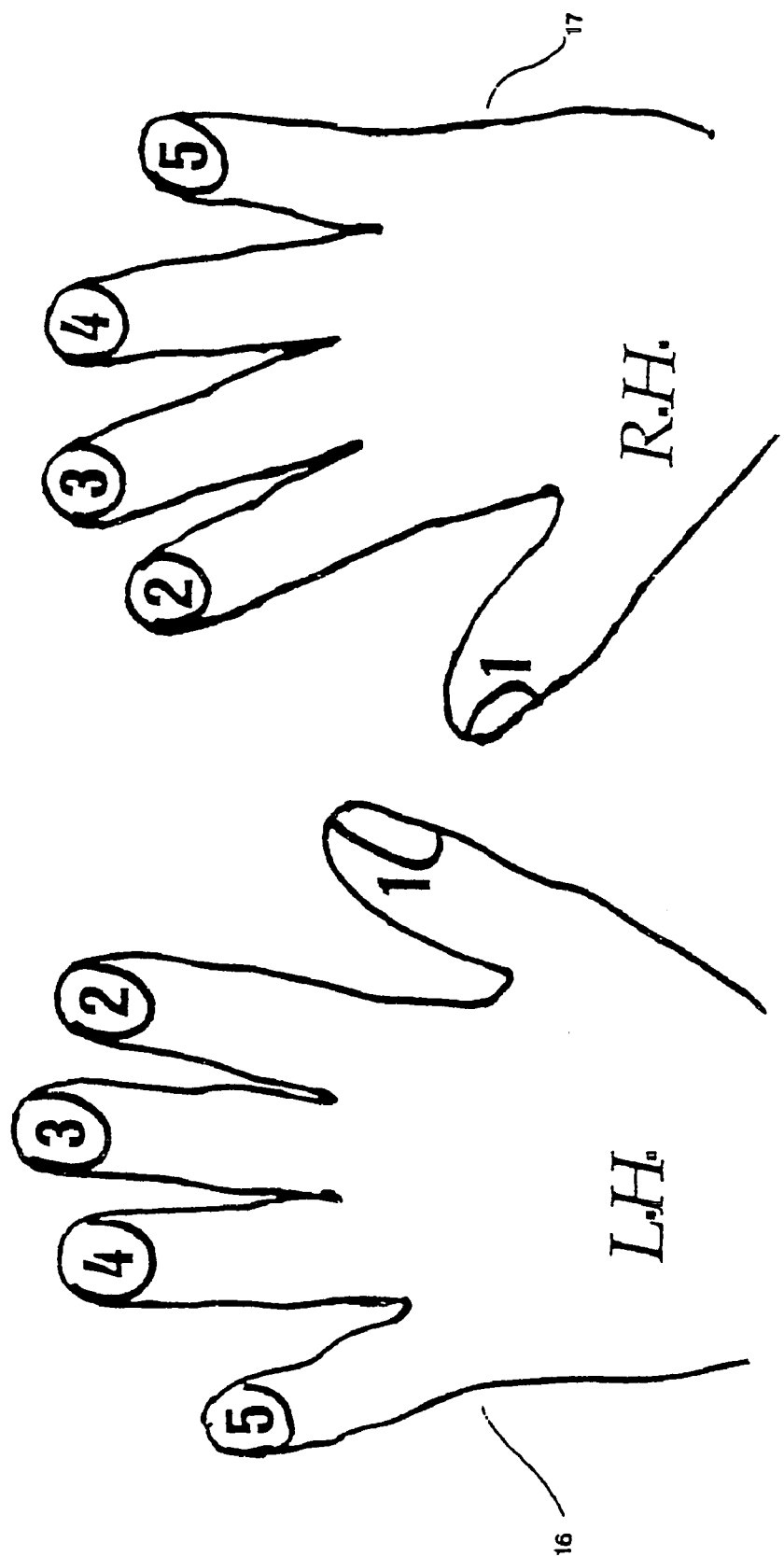
FIG. 2 is a plan view of the two hands of a keyboard player.

The operation of the tablature system according to the present embodiment of the invention involves the application of a numbering system to indicate the individual fingers of the performer's left and right hands. This convention is shown in FIG. 2, which shows the fingers of the left hand 16 as denoted by the numbers from 1 for the thumb to 5 for the little finger. Similarly, the convention is shown in FIG. 2 as denoting the fingers of the right hand 17 by the numbers from 1 for the thumb to 5 for the little finger.

The operation of the tablature system according to the present embodiment of the invention also involves the identification of 'home' positions for the performer's hands, and thus of the fingers of the hands, relative to the keyboard. In the tablature system according to the present embodiment, the home positions for the performer's hands may change during the playing of a piece of music.

Figure 3:
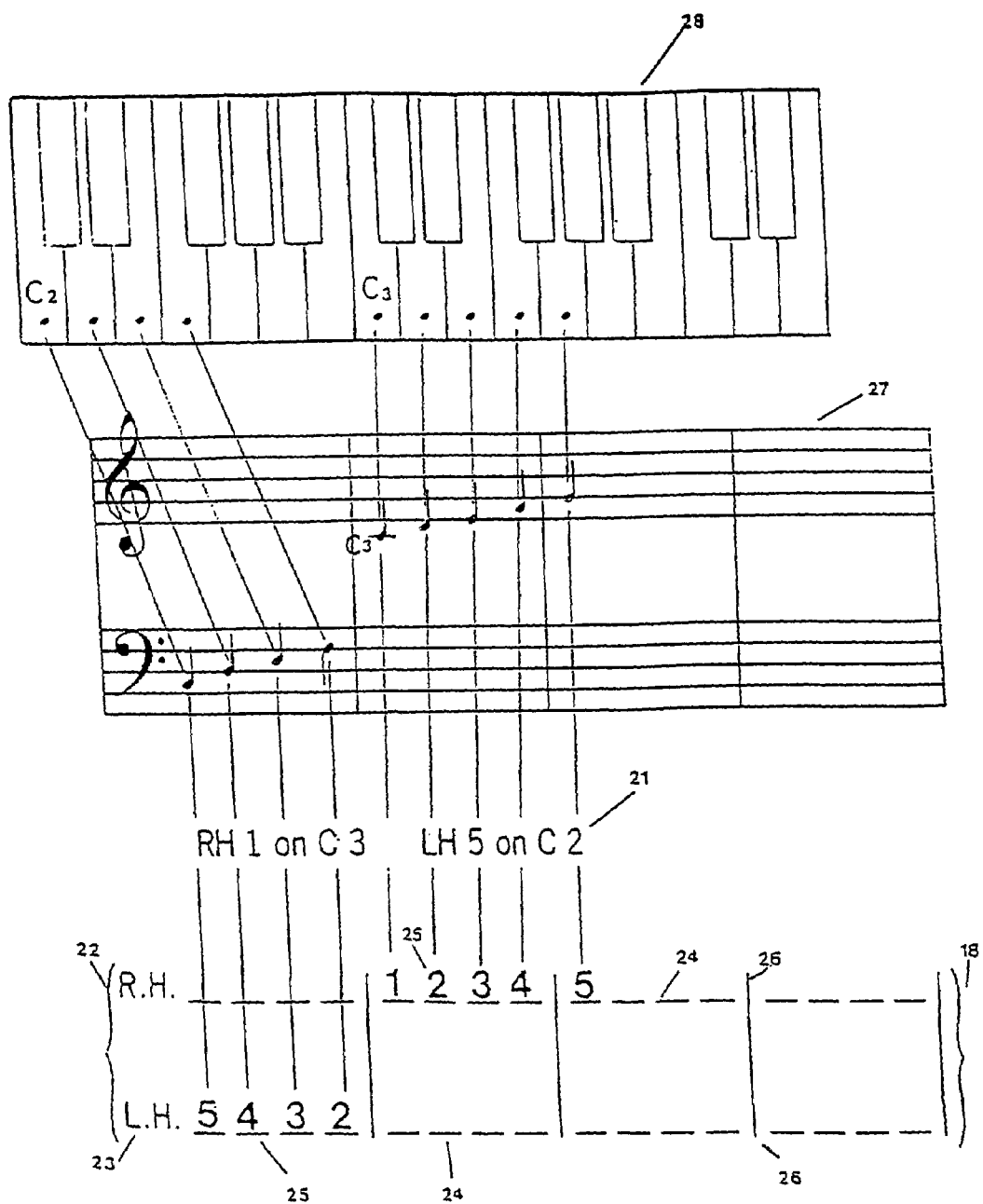

FIG. 3 illustrates how a method of tablature according to the present invention relates to a conventional keyboard. A representation of the present tablature system as it could appear in sheet music is generally indicated by the bracket 18. The embodiment of the invention as shown in FIG. 3 illustrates music with a 'four four' ($_4^4$) time signature, that is with four beats to the bar, each beat being of the duration of a quarter note.

The representation 18 includes a line of text 21 which reads 'RH 1 on $C_3$ LH 5 on $C_2$' to indicate that the 'home' positions allocate finger 1 of the right hand to the key $C_3$ and finger 5 of the left hand to key $C_2$.

The representation 18 also includes a line 22 and a line 23. The lines 22 and 23 are prefixed with the symbols 'R.H.' and 'L.H.' respectively, indicating that the line relates to the right hand and left hand of the performer respectively. Each line 22 and 23 includes a run of beat markers 24 which are preferably in the form of underscore characters. The beat markers 24 are arranged in a horizontally extending line. A vertical bar marker 26 separates each beat. It is preferred that each bar marker 26 be in the form of a relatively short, vertically extending line. Because the music which is represented by FIG. 3 has a $_4^4$ time signature, each bar marker 26 separates each group of four beat markers 24.

The piece of music which is shown in the conventional music notation system 27 in FIG. 3 consists of nine notes, four of which are on the bass clef and five of which are on the treble clef. The keys of the conventional keyboard which correspond to those nine notes are marked on the portion of keyboard which appears at 28 in FIG. 3. The corresponding representation of the music according to the present embodiment of the invention is shown at 18. That representation consists of the numbers 5, 4, 3, 2 and 1 on the line 23 and of the numbers 1, 2, 3, 4 and 5 on the line 22.

Each of these numbers is vertically aligned above a beat marker 24 to indicate that fingers 5, 4, 3, 2 and 1 of the left hand are to strike their respective home keys on successive beats and that fingers 1, 2, 3, 4 and 5 of the right hand are to strike their respective home keys on succeeding beats.

Figure 4:
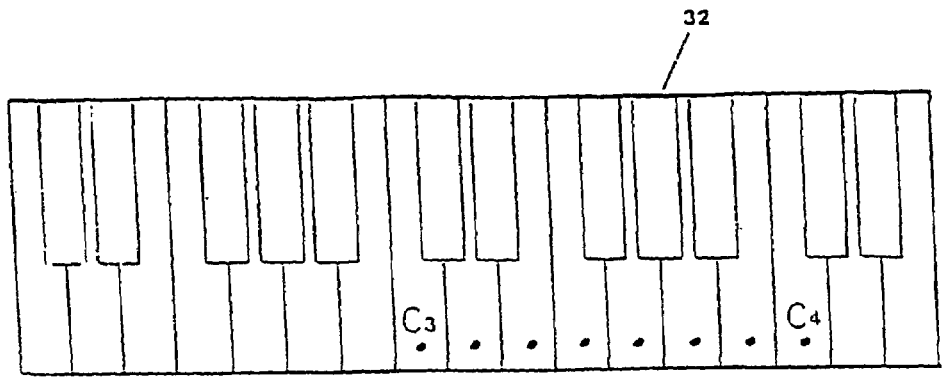
Figure 4:
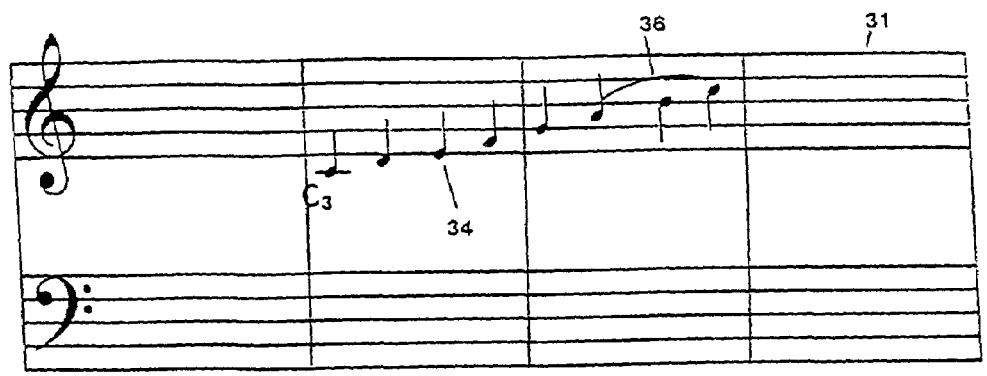
Figure 4:
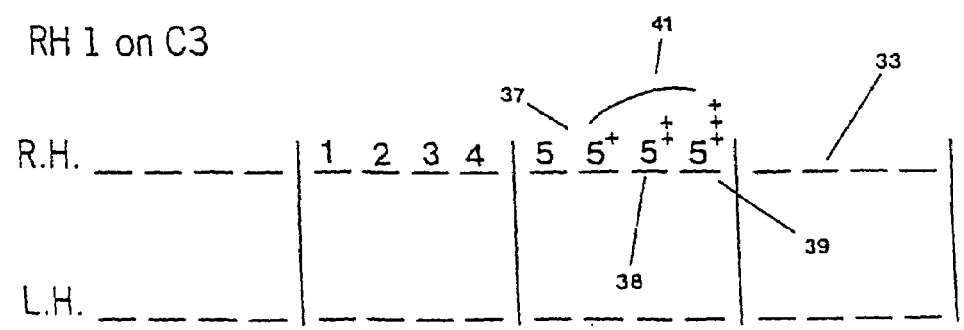

FIG. 4 illustrates a piece of music 31 represented in the conventional notation system, while the keyboard 32 shows the keys which are struck in playing the piece of music 31. The music 31 is represented according to the present invention at 33.

The piece of music 31 has eight ascending notes. The pitches of the first five of these notes is such that they are played by successively striking the home keys of fingers 1 to 5 of the right hand.

The sixth, seventh and eighth notes are respectively one, two and three key positions to the right of the fifth finger of the right hand. To indicate that the sixth note 37 is played by moving the fifth finger of the right hand one key to the right from its home position to before striking a key, the sixth note in representation 33 is shown with a superscript of a single 'plus' sign, that is as $5^+$.

To indicate that the seventh 38 note is played by moving the fifth finger of the right hand two keys to the right from its home position before striking a key, the seventh note in representation 33 is shown with a superscript of two vertically aligned 'plus' signs, that is as $5^{+^+}$.

Similarly, to indicate that the eighth note 39 is played by moving the fifth finger of the right hand three keys to the right from its home position before striking a key, the eighth note in representation 33 is shown with a superscript of three vertically aligned 'plus' signs.

It is preferred that a symbol in the form of a skewed bracket 41 be placed above the notes 37, 38 and 39 to indicate that these notes are played by moving a finger from its home key.

Figure 5:
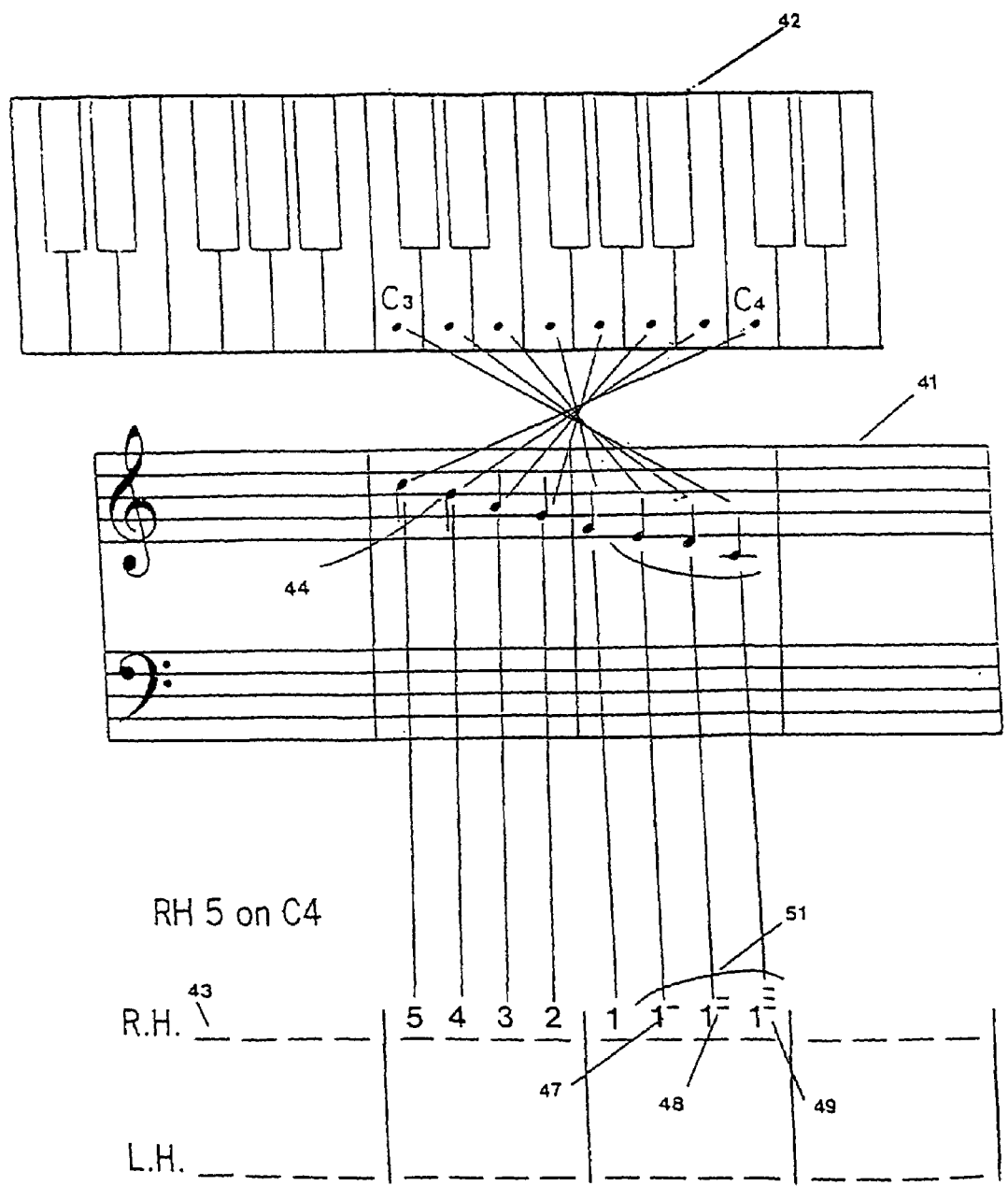

FIG. 5 illustrates a piece of music 41 represented in the conventional notation system, while the keyboard 42 shows the keys which are struck in playing the piece of music 41. The music 41 is represented according to the present invention at 43.

The piece of music 41 has eight descending notes. The pitches of the first five of these notes is such that they are played by successively striking the home keys of fingers 1 to 5 of the left hand.

The sixth, seventh and eighth notes are respectively one, two and three key positions to the left of the first finger of the left hand. To indicate that the sixth note 47 is played by moving the first finger of the left hand one key to the left from its home position to before striking a key, the sixth note in representation 43 is shown with a superscript of a single 'minus' sign, that is as 1⁻.

To indicate that the seventh 48 note is played by moving the first finger of the right hand two keys to the left from its home position before striking a key, the seventh note in representation 43 is shown with a superscript of two vertically aligned 'minus' signs, that is as 1⁻⁻.

Similarly, to indicate that the eighth note 49 is played by moving the fifth finger of the left hand three keys to the left from its home position before striking a key, the eighth note in representation 43 is shown with a superscript of three vertically aligned 'minus' signs.

It is preferred that a symbol in the form of a skewed bracket 51 be placed above the notes 47, 48 and 49 to indicate that these notes are played by moving a finger from its home key.

Figure 6:
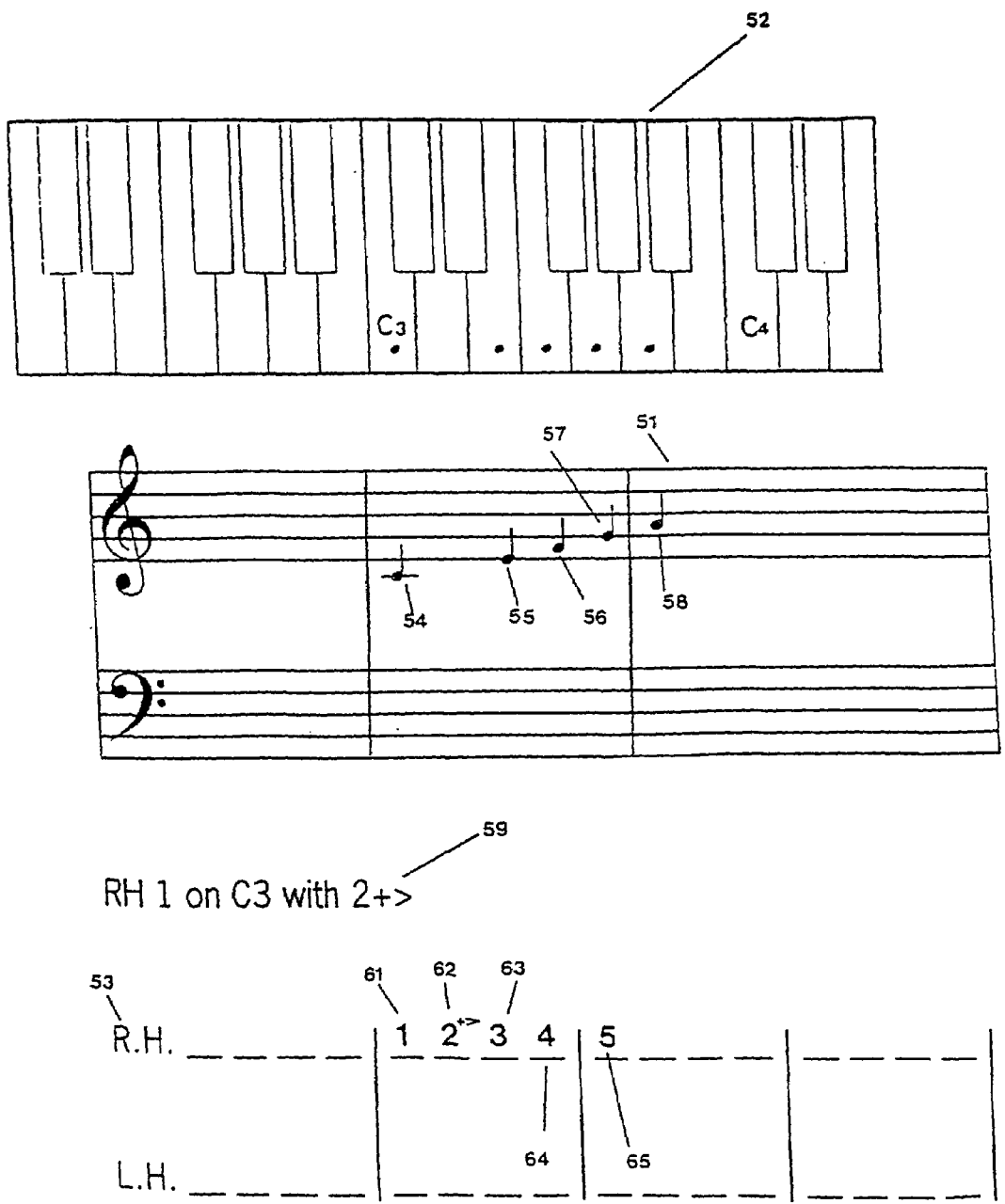

FIG. 6 illustrates a piece of music 51 represented in the conventional notation system, while the keyboard 52 shows the keys which are struck in playing the piece of music 51. The music 51 is represented according to the present invention at 53.

The piece of music 51 has five ascending notes which are numbered 54 to 58. The pitch of the first of these notes is middle C, and it is played by finger number 1 on its home key $C_3$. The second to fifth notes (numbered 55 to 68) are each two key widths to the right of each of fingers 2 to 5 respectively.

Accordingly, the notes 54 to 58 are played by placing finger 1 of the right hand on its home key and displacing all the other fingers of the right hand by one key position to the right.

This initial arrangement of the fingers away from the home keys is indicated in the representation 53 according to the present invention by the instruction 'R.H. 1 of C3 with 2⁺ᐳ. In the composite symbol '2⁺ᐳ' the symbol 'ᐳ' indicates a shift of multiple fingers to the right, the single plus symbol '⁺' indicates that the shift is by one key width, and the symbol '2 ' indicates that all the fingers from finger number 2 up to 5 move.

The numbers '1' to '5' appearing at positions 61 to 65 in the representation 53 according to the present invention then indicate that fingers 1 to 5 are used to play the notes.

Figure 7:
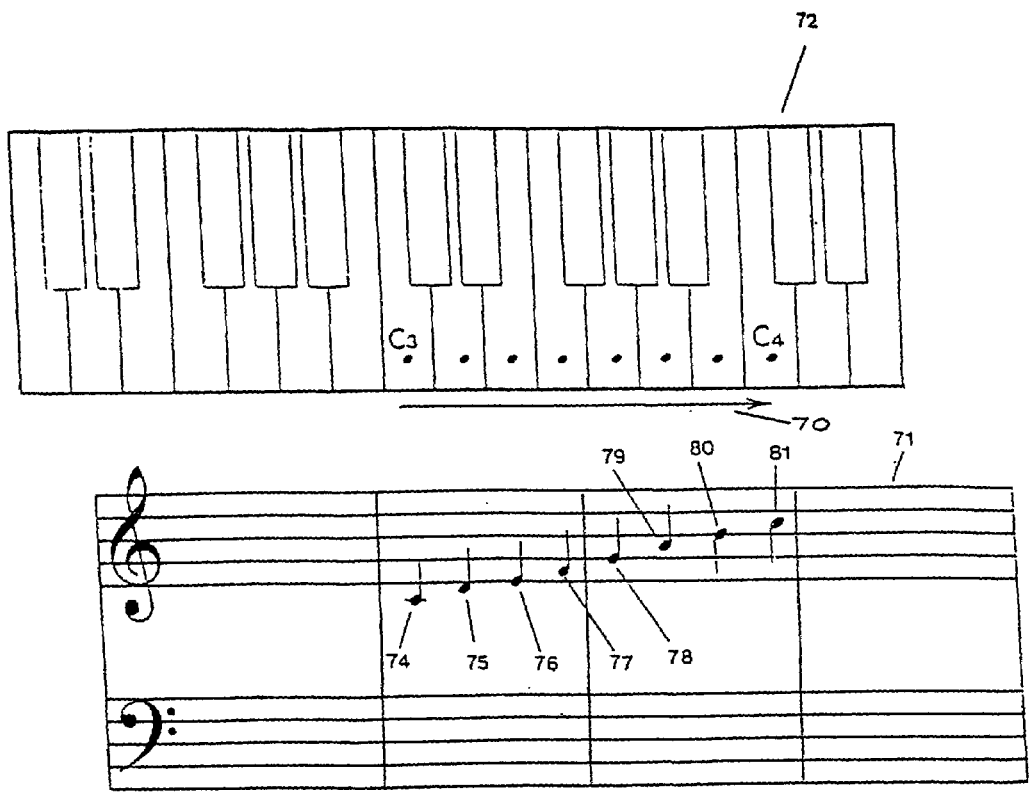
Figure 7:
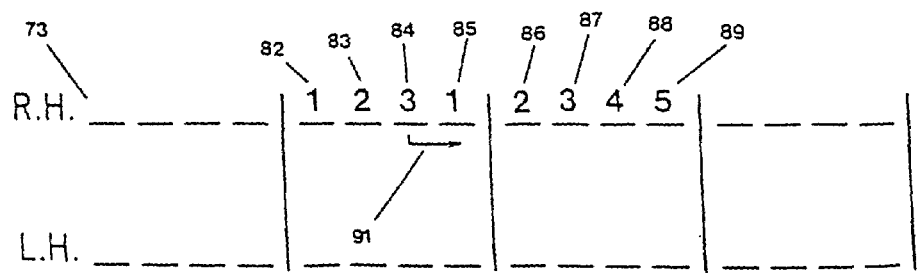

FIG. 7 illustrates a piece of music 71 represented in the conventional notation system, while the keyboard 72 shows the keys which are struck in the playing of the piece of music 71. The music 71 is represented according to the present invention at 73.

The piece of music 71 has eight ascending notes numbered 74 to 81. The pitches of the first three of these notes (the notes which are numbered 74, 75 and 76) are such that they are played by successively striking the home keys of fingers 1 to 3 of the right hand.

The fourth to eighth notes (the notes which are numbered 77 to 81) are the ascending notes immediately following the first three notes on the keyboard. These five notes are played by the performer tucking the thumb of the right hand (that is, finger 1 of the right hand) to the right under fingers 2 and 3 to strike the key which is immediately to the right of finger 3, and then moving the entire hand to the right to play the four notes 78, 79, 80 and 81.

To indicate that the first three notes 74 to 76 are played by striking keys at the home positions of the first three fingers of the right hand, the representation 73 according to the present invention shows the numbers '1', '2' and '3 ' at positions 82, 83 and 84 on representation 73.

To indicate that the fourth to eighth notes are played by moving first the thumb, and then the entire hand to the right to play the five notes 77 to 81, the representation 73 shows an arrow 91 which spans one key width, and the numbers '1 ' to '5 ' at positions 85 to 89.

Figure 8:
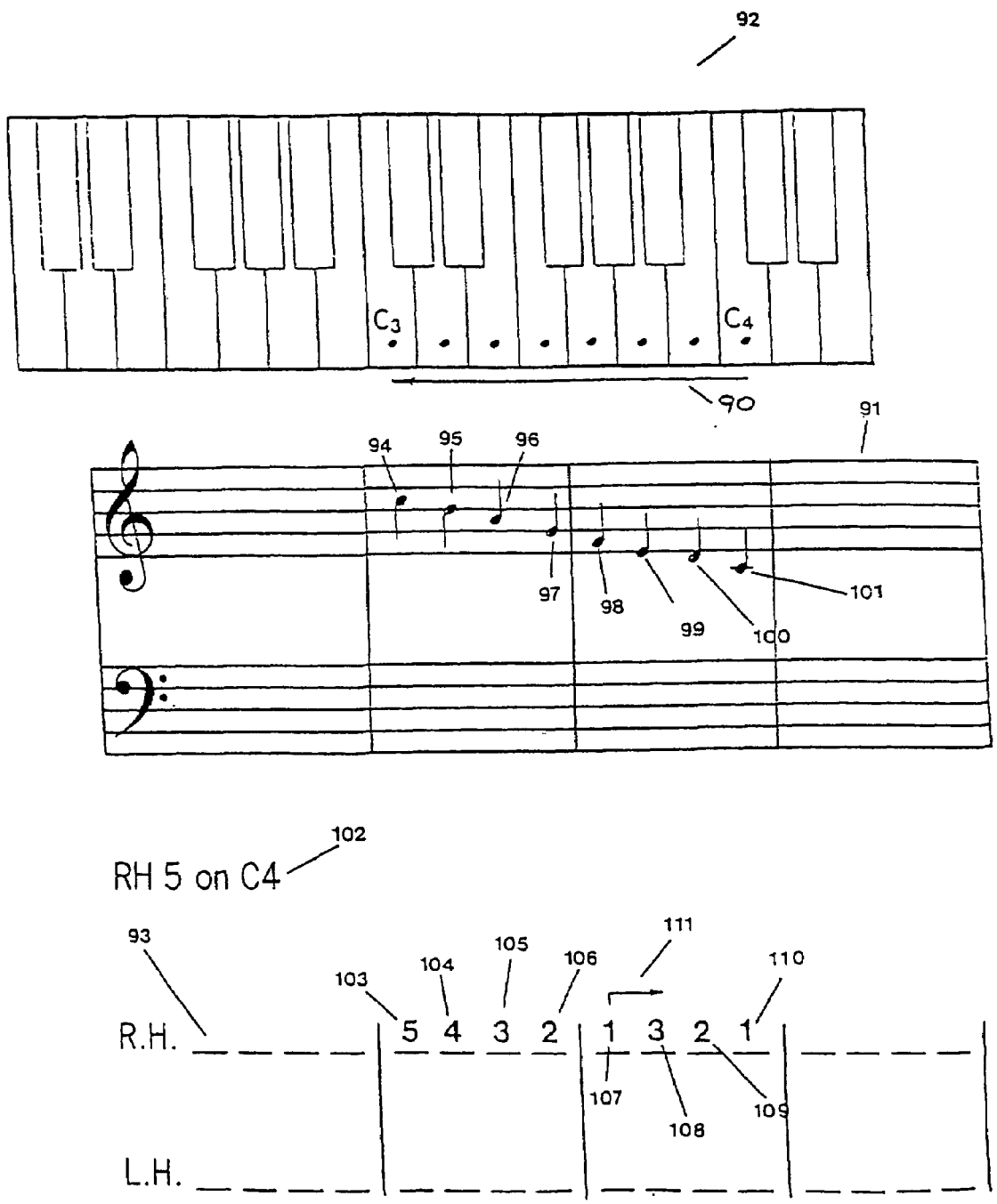

FIG. 8 illustrates a piece of music 91 represented in the conventional notation system, while the keyboard 92 shows the keys which are struck in playing the piece of music 91. The music 91 is represented according to the present invention at 93.

The piece of music 91 has eight descending notes numbered 94 to 101. The pitches of the first five of these notes (the notes which are numbered 94 to 98) are such that they are played by placing finger 5 of the right hand on the note $C_4$ to establish home keys for the right hand and then successively striking the home keys of fingers 5 to 1 of the right hand.

The sixth to eighth notes (the notes which are numbered 99 to 101) are the descending notes immediately following the first five notes on the keyboard. These three notes are played by the performer moving the fingers 3 and 2 to the left over finger 1 (the thumb) to play note 99 by striking the key which is immediately to the left of finger 1, with finger 3 and note 100 with finger 2, and then picking up the thumb and sliding it under fingers 2 and 3 to play note 101.

To indicate that the fingers of the right hand are to be placed on home keys to play the first five notes 94 to 98, the representation 102 according to the present invention includes the instruction 'R.H. 5 on $C_4$ '. Further, to indicate that these first five notes 94 to 108 are to be played by striking keys with fingers 5 to 1, the representation 102 is marked with the numbers '5', '4', '3', '2' and '1'.

To indicate that the sixth to eighth notes are played by moving first finger 3, and then the entire hand to the left to play the three notes 99 to 101, the representation 93 shows an arrow 111 which spans one key width, and the numbers '3' to '1' at positions 108 to 110.

Figure 9:
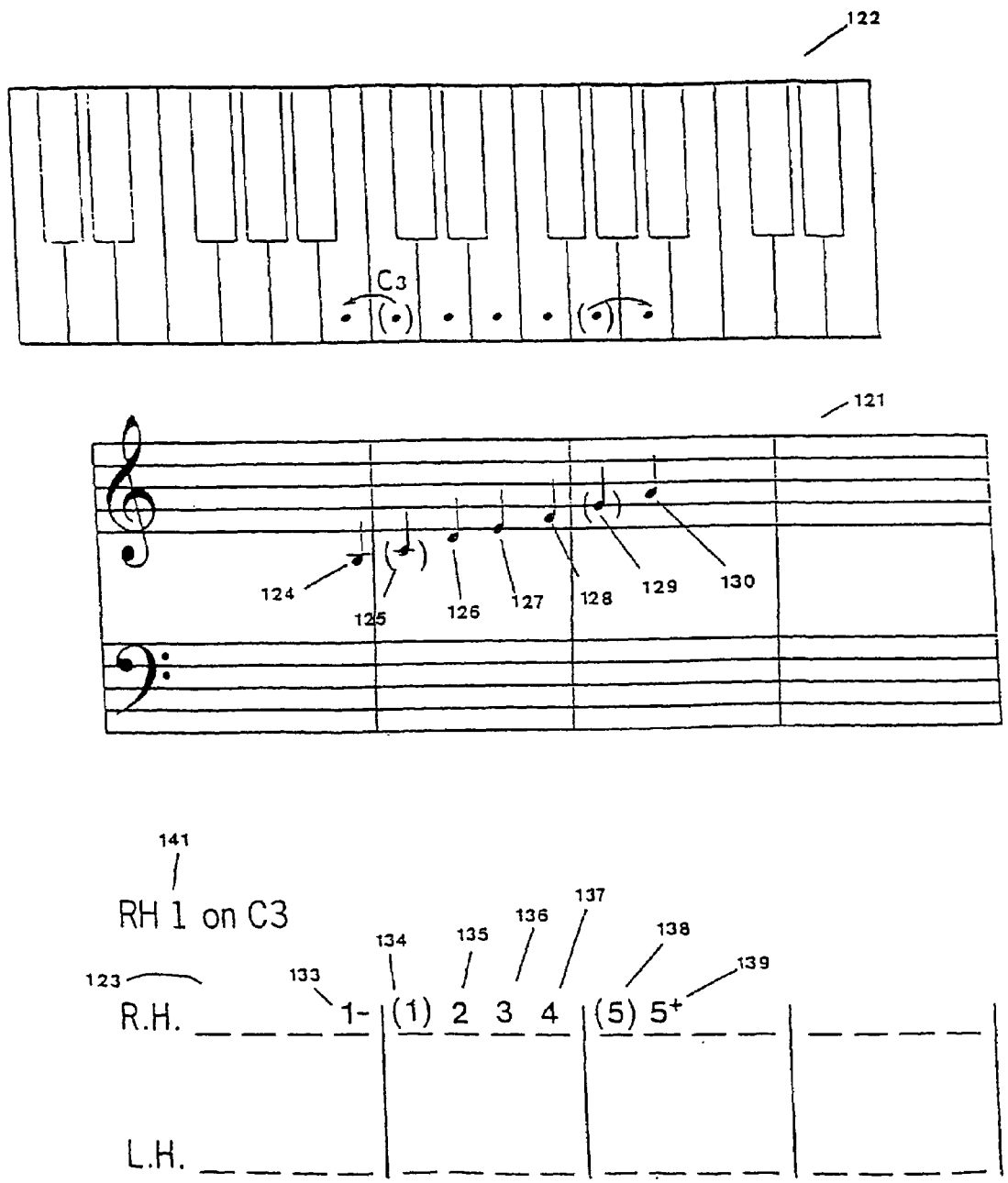

FIG. 9 illustrates a piece of music 121 represented in the conventional notation system, while the keyboard 122 shows the keys which are struck in playing the piece of music 121. The music 121 is represented according to the present invention at 123.

The piece of music 121 has seven ascending notes numbered 124 to 130. The pitch of the first of these notes (numbered 124) is by placing finger 1 of the right hand on middle C (the key marked $C_3$) to establish home keys for the right hand and then moving finger 1 one key to the left to strike the note which is one key to the left of $C_3$.

The second to sixth notes (the notes which are numbered 126 to 129) are the five ascending notes following immediately to the right of the first note. These three notes are played by the performer successively striking the keys which are the home keys for fingers 1 to 5 of the right hand.

The seventh note is the ascending note following immediately to the right of the sixth note on the keyboard. This note is played by the performer moving finger 5 of the right hand one key position to the right and striking that key.

To indicate that the fingers of the right hand are initially to be placed on home keys to play the seven notes 124 to 130, the representation 123 according to the present invention includes the instruction 141 'R.H. 1 on $C_3$'.

To indicate that the first note 124 of these seven notes is to be played-by moving finger 1 by one key lower in pitch, the position 133 in representation. 123 is marked with the symbol '$1^-$'.

To indicate that the notes 125 to 129 are to be played by striking the keys corresponding to the home positions of fingers 1 to 5, the positions 135 to 138 on representation 123 are marked with the finger numbers '1 ' to '5 ' respectively.

To indicate that the seventh note 130 is to be played by moving finger 5 by one key higher in pitch, the position 139 in representation 123 is marked with the symbol '$5^+$'.

Figure 10:
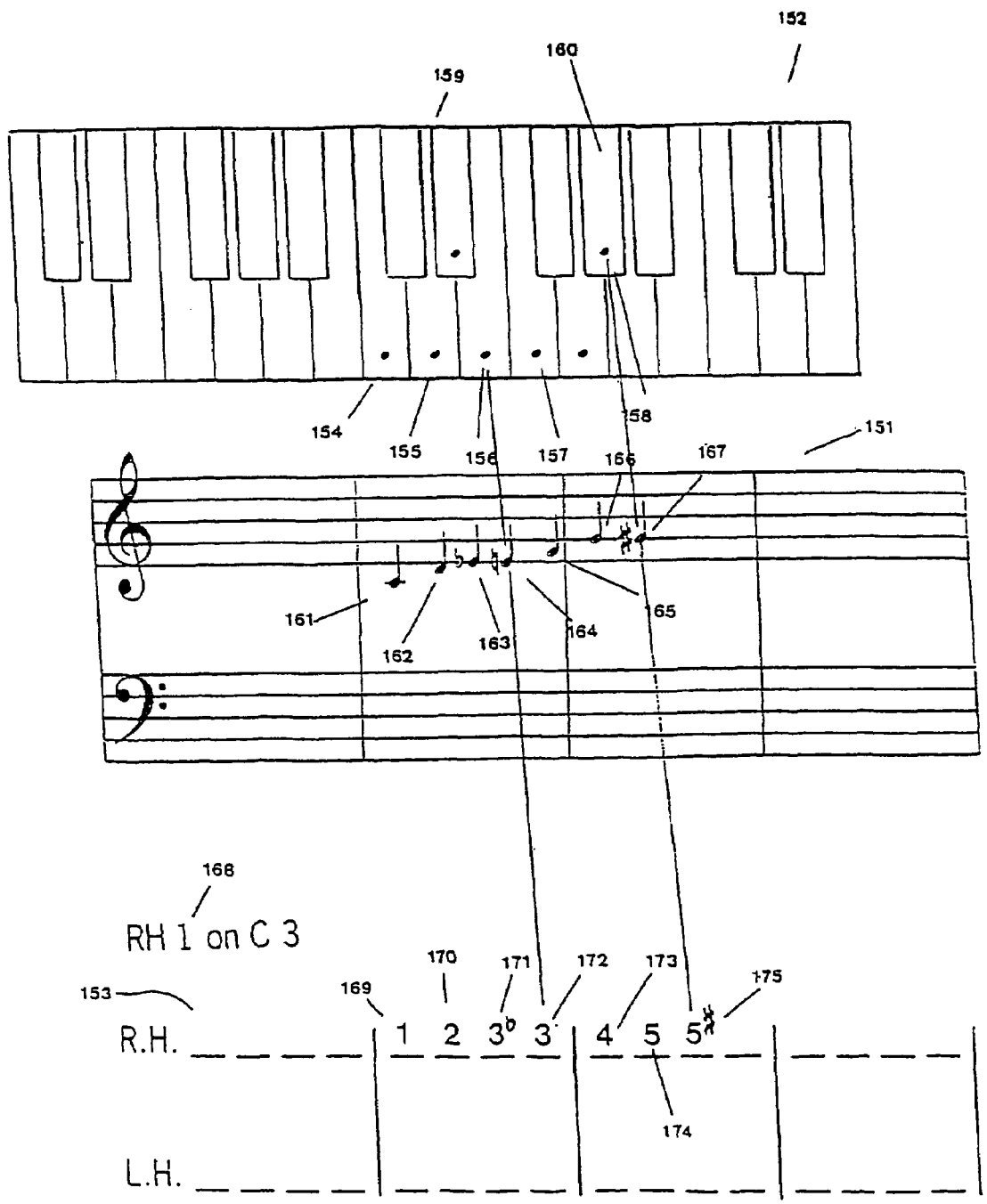

FIG. 10 illustrates the operation of the present invention in relation to apiece of music which includes semitones, and thus in which the performer's fingers must move to the black keys of the keyboard to play the music.

The Figure illustrates a piece of music 151 in the conventional notation system while the keyboard 152 shows the keys which must be struck in playing the piece of music 151. The music 151 is represented according to the present invention at 153.

The piece of music 151 has seven ascending notes numbered 161 to 167. The pitch of the first of these notes (numbered 161) is by placing finger 1 of the right hand on middle C (the key marked $C_3$) to establish home keys for the right hand and striking the key $C_3$.

Similarly, the second note 162 of the piece of music is played by striking the home key for finger 2 of the right hand.

The third note 163 is an 'E-flat' key, denoted by the 'flat' symbol '♭' before it. This symbol indicates that the note is a half tone in pitch below middle E. The black keys on the keyboard 152 are the half tone keys, and the black key corresponding to '$E_3$-flat' is the black key which is numbered 159 in FIG. 10.

The fourth, fifth and sixth notes of the piece of music 151 are the notes which are numbered 164, 165 and 166. They are played by striking the home keys for fingers 3, 4 and 5 of the right hand.

The seventh note of the piece of music 151 is the note which is numbered 167. It is preceded in the traditional notation 151 by the 'sharp' symbol '♯', which indicates that note higher in pitch than is the home key for finger 5 of the right hand.

The representation 153 according to the present invention includes the instruction 141 'R.H. 1 on $C_3$' to indicate the home positions of the fingers of the right hand for playing the piece of music 151.

To indicate that the notes 161 and 162 are to be played by striking the keys corresponding to the home positions of fingers 1 and 2 , the positions 169 and 170 on representation 153 are marked with the finger numbers '1' and '2' respectively.

To indicate that the third note 163 is to be played by moving finger 3 by one black key lower in pitch, the position 171 in representation 153 is marked with the symbol '$3^+$'.

To indicate that the fourth, fifth and sixth notes 164, 165 and 166 are to be played by striking the keys which correspond to the home positions of fingers 3, 4 and 5 the positions 172, 173 and 174 in representation 153 are marked with the symbols '3', '4' and '5' respectively. (Unlike the operation of conventional notation rules for sharps, flats, naturals and key signatures, the absence of a 'flat' superscript in conjunction with the numbers '3', '4' and '5' indicates that the keys to be struck by those fingers are the white keys. Similarly the same convention applies to 'sharp' superscripts. Numbers without the 'sharp' and 'flat' superscript are always white keys. Notes with such superscripts are always black keys.)

To indicate that the seventh note 167 is to be played by striking moving finger 5 by one black key higher in pitch, the position 175 is marked with the symbol '$5^+$'.

Figure 11:
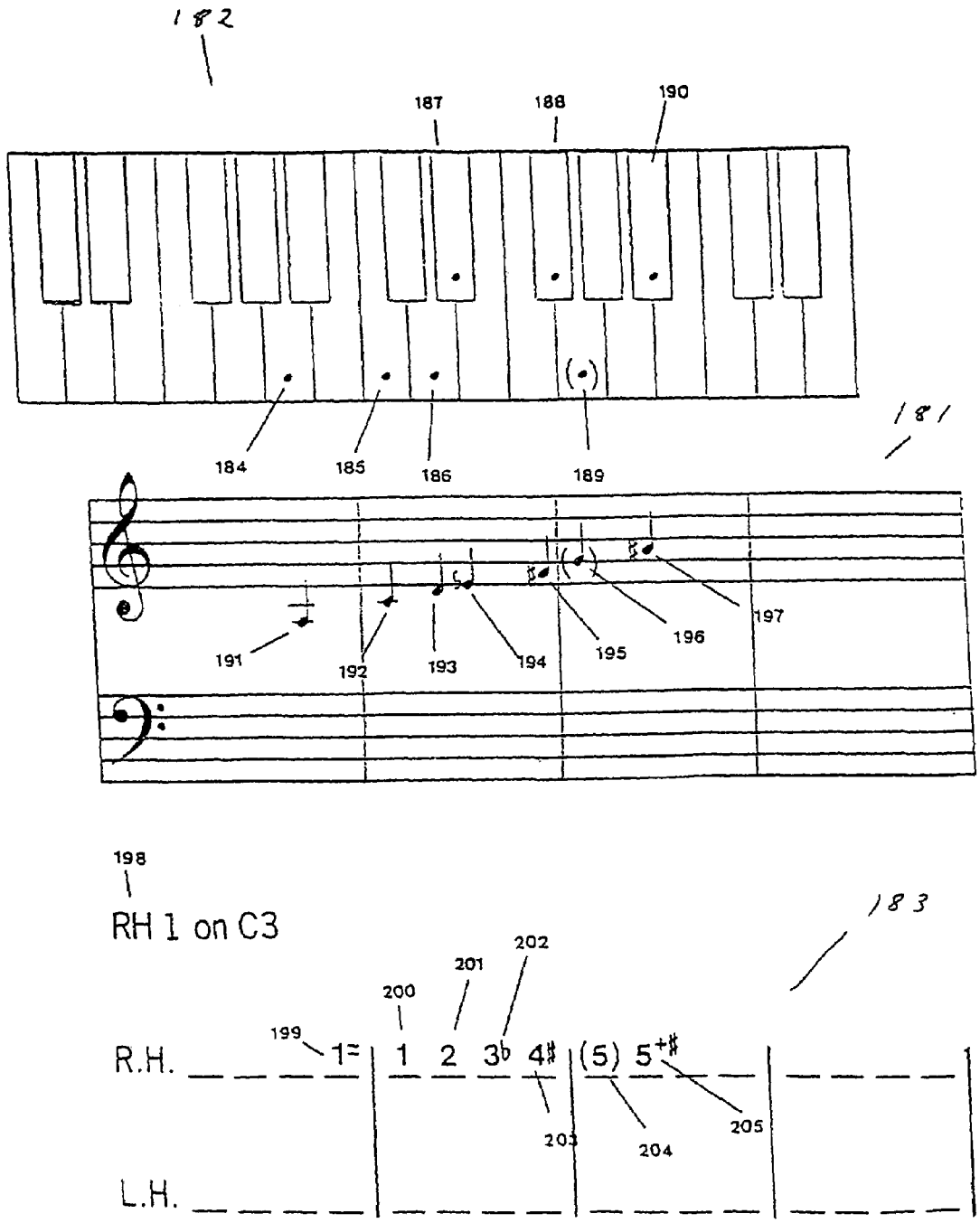
Figure 14:
Figure 15:
Figure 16:
Figure 17:
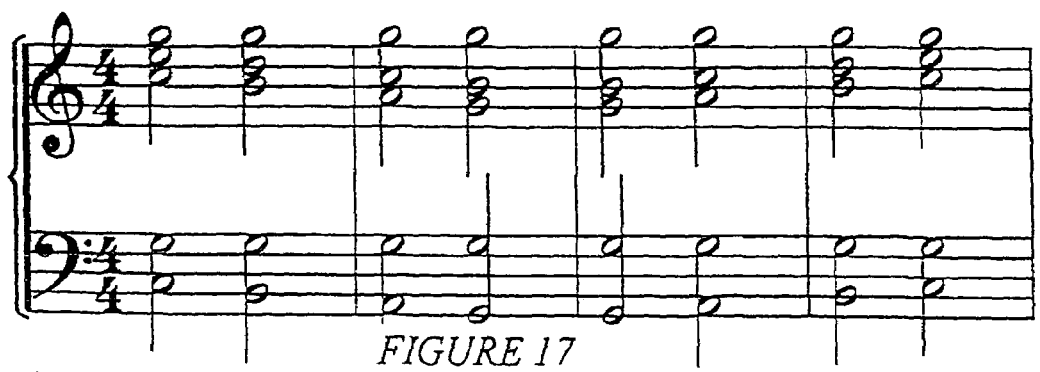

FIG. 11 illustrates the operation of the present invention in relation to a piece of music which includes semitones and extensions of the player's fingers away from home keys.

The Figure illustrates a piece of music 181 in the conventional notation system while the keyboard 182 shows the keys which must be struck in playing the piece of music 181. The music 181 is represented according to the present invention at 183.

The piece of music 181 has seven ascending notes numbered 191 to 197. The pitch of the first of these notes (numbered 161) is by placing finger 1 of the right hand on middle C (the key marked $C_3$) to establish home keys for the right hand and then moving finger 1 to keys to the left and striking that key.

The second and third notes 192 and 193 are played by striking the home keys for the second and third fingers of the right hand.

The fourth note 194 is an 'E-flat' key, denoted by the 'flat' symbol '♭' before it. This symbol indicates that the note is a half tone in pitch below middle E. The black keys on the keyboard 152 are the half tone keys, and the black key corresponding to '$E_3$-flat' is the black key which is numbered 187 in FIG. 11.

The fifth note of the piece of music 181 is the note which is numbered 195. It is preceded in the traditional notation 181 by the 'sharp' symbol '♯', which indicates that the note is '$G_3$sharp'. This note is played by striking the black key which is one half note higher in pitch than is the home key for finger 4 of the right hand.

The sixth note 196 in the piece of music 181 is played by striking the home key 189 for the fifth finger of the right hand.

The seventh note 197 in the piece of music 181 is preceded by the sharp symbol ♯. The composite symbol indicates the note is one half tone above the note which is one octave above middle C. To play this note, the fifth finger of the right hand si moved one key to the right and then to the next higher black key, numbered 190 in the representation of he keyboard 192.

The representation 183 according to the present invention includes the instruction 198 'R.H. 1 on $C_3$' to indicate the home positions of the fingers of the right hand for playing the piece of music 181.

To indicate that the note 191 is played by moving finger 1 of the right hand by two keys to the left to strike a key, the position 199 in the representation 183 is marked $1^=$.

To indicate that the notes 192 and 193 of the piece of music 181 are played by fingers 1 and 2 of the right hand, the positions 200 and 201 in the representation 183 are marked 1 and 2 respectively.

To indicate that the note 194 is played by moving the third finger of the right hand from the home position to the black key which is a half tone lower in pitch than the home key for finger 3, the position 202 in the representation 183 is marked with the symbol 3ᵇ.

To indicate that the note 195 is played by moving finger 4 of the right hand to the black key which is a half-tone higher in pitch than the home key for finger 4, the position 203 is marked with the symbol 4ᵗ.

To indicate that the note 195 is played by moving finger 4 of the right hand to the black key which is one half-tone higher in pitch than the home key for finger 4, the position 203 in the representation 183 is marked with the symbol 4ᵗ.

To indicate that the note 196 is played by striking the home key of finger 5 of the right hand, the position 204 in representation 183 is marked with the symbol 5.

To indicate that the note 197 is played by moving the fifth finger of the right hand by both a key width to the right plus a movement to the black key which is one semi-tone higher in pitch, the symbol '5 ' at position 204 of the representation carries both of the superscripts '+' and '♯'.

FIG. 12 illustrates how various chord forms are represented according to the present invention.

Chord forms are represented according to the traditional notational system at 211, with the corresponding form according to the present invention at 212.

The first bar of music 214 consists of four semibreves which sound for the length of the bar. They are played by simultaneously striking home keys 1, 3 and 5 of the right hand and home key 5 of the left hand on the first beat of the bar 214.

These finger movements are represented by the three symbols '1', '3' and '5 ' for the right hand and '5' for the left hand vertically aligned at 218. Each of the symbols '5', '3' and '1' for the right hand has a 'tie' symbol extending the length of bar to indicate that the note is to sound for the entire length of the bar.

The left hand $C_2$ note of bar 214 is repeated in bars 215, 216 and 217 of the music 211. This is emphasised in the representation 212 by the series of ties 222, 223 and 224 connecting these notes from bar to bar.

The music which is to be played by the right hand in the bar 215 is a minim of pitch $C_2$, to be played on the first beat of the bar and two minims, of E and G pitch, to be played simultaneously on the second beat of the bar. This is shown in the representation 212:

by the symbol '1 ' on the first beat with a tie extending the duration of the two beats; followed by the symbols '5' and '3' appearing on the third beat of the bar, with a tie extending the duration of two beats (to the end of the bar).

The music which is played during the bar 216 is four crotchets, being the notes $C_2$, E, G and E played in succession on successive beats of the bar. This is shown in representation 212 by the symbols '1', '3', '5' and '3' appearing on the markers for successive beats of the bar.

The music which is to be played during bar 211 is a chord of two crotchets of pitch $C_2$ and to be played on the first beat of the bar, and a chord of two crotchets of pitch E and G to be played on the third beat of the bar. The finger instructions for this bar are shown in representation 212 by:

the two symbols '1' and '3' on the first beat of the bar, combined with a tie symbol which extends to the end of the second beat; and the symbols '3' and '5' on the third beat of the bar, combined with a tie symbol which extends to the end of the fourth beat of the bar.

FIGS. 13 to 17 show representations according to the present invention of several chord forms, in conjunction with the representations of those chord forms according to conventional musical notation. These Figures are illustrative of the principles which are set out in preceding parts of this specification, and are self explanatory in the light of those principles, except for the use of the symbols which are indicated at 220 and 221 in FIG. 14 and which are called 'to be occupied by' symbols.

The symbols 220 and 221 are arrows curving downwards and upwards respectively along the time lines. The 'to be occupied by' symbol which curves downwards from the number '3' to the number '1' in the first bar of the music indicates that the right hand is to be moved to the right so that the key position that was occupied by the third finger is to be occupied by the first finger when the had movement is complete.

The 'to be occupied by' symbol 221 which curves upwards from the number '1' to the number '3' indicates that the right hand is to be moved to the left so that the key position that was occupied by the first finger is to be occupied by the third finger when the hand movement is complete.

Musical notes are of differing, but standardised duration. The representation of note duration according to the present invention is illustrated by reference to FIGS. 18 and 19.

The piece of music 230 of FIG. 18 is in a $\frac{4}{4}$ time signature. The first bar 232 for the left hand has a single note of pitch $C_2$ which lasts four beats (a semibreve). This note is shown at 223 in the representation according to the present invention by the symbol '1 ' appearing on the first eat of the bar at 233 in conjunction with the 'tie' symbol 234 extending the duration of the bar. The symbol '1' indicates that the note is to be played by striking the home key of finger 1 of the right hand and the tie symbol indicates that the note is to be played for the duration of the bar.

The second bar 236 for the right hand has two notes, each of which lasts two beats (that is, they are both minims), and are respectively of pitch D and E.

These notes are shown at 237 and 238 in the representation 231 according to the present invention by the symbols '2' and '3' appearing on the first and third beats of the bar 236 with the 'tie' symbols 239 and 240 each extending for the duration of half the bar. The symbols '2' and '3' respectively instruct the player to play these notes by striking the home keys of the fingers 2 and 3 of the right hand.

The third bar 242 for the right hand has four notes, each of which lasts one beat (that is, they are all crotchets) and are of pitch F, E, D and C respectively. The notes are shown at 243 in the representation 231 according to the present invention of the symbols '4', '3', '2' and '1' appearing on the four successive beats of the bar 242. These four symbols instruct the player to play four notes by striking the home keys for the fourth, third, second and first fingers of the right hand. Because these symbols, and no other symbols, appear within the bar 242 for the left hand the player allows the note to sound only during the beat on which it appears in representation 231.

The fourth bar 246 for the right hand has eight notes, each of which lasts half a beat (that is, they are all quavers) and are of pitch D, E, F, G, G, F, E, D and C respectively.

The notes are shown at 247 according to the present invention by the symbols '23', '45', '43' and '21' appearing on the four successive beats of the bar. These four symbols instruct the player to play the music by striking:

the home keys for fingers 2 and 3 successively during the first beat of the bar;

the home keys for the fingers 4 and 5 successively during the second beat of the bar;

the home keys for the fingers 4 and 3 successively during the third beat of the bar; and the home keys for the fingers 2 and 1 successively during the final beat of the bar.

The piece of music 251 of FIG. 19 is in a $_4^4$ time signature.

The first bar 252 in the music 251 has eight triplets. That is, it has four groups of three notes, each group of three notes to be played in the time for two quavers (one beat). This note combination is shown in the representation 252 according to the present invention as a three digit symbol connected by a tie symbol and the superscript '3' on each beat of the bar.

The second bar 253 of the piece of music 251 has four groups of four notes, each group of notes to be played during one beat (that is, the notes are semiquavers).

This note combination is shown in the representation 254 according to the present invention as a four digit symbol on each beat of the bar.

Figure 20:
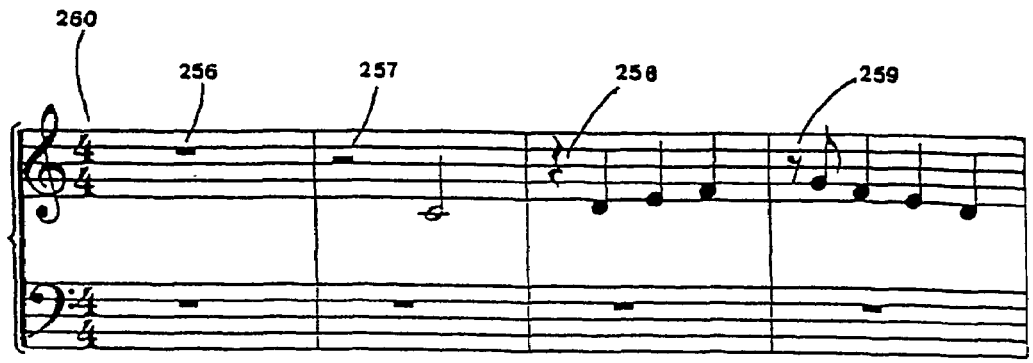

In FIG. 20, the first bar of the piece of music 260 shows a time rest for the duration of a semibreve, that is a short thick line parallel to, touching and below the fourth line of the treble stave. This rest indicates that there is no note played during the bar.

The representation 265 according to the present invention is shown at 261 as a continuous horizontal line extending the duration of the bar.

The music 260 also shows the rests for the minim at 257, for the crotchet at 258 and for the quaver at 259. The representation 265 according to the present invention shows the equivalent instructions respectively as:

a horizontal line 262 extending for two beats (half a bar);

a horizontal line 263 extending one beat (a quarter of a bar); and a horizontal line 264 extending one beat.

Figure 21:

In FIG. 21, the third and fourth bars show a tie 268 connecting two semibreves of middle C pitch, each at the beginning of a bar. This tie denotes that the second note is not actually struck, but that the actual duration of the first note is to be two bars.

The equivalent instruction to the player in the representation 269 according to the present invention is the symbol '1' appearing on the first beat of the first bar 270 to instruct the player to strike the home key for finger 1, and a 'tie' symbol 271 extending the full duration of two bars to instruct the player to maintain the note for two bars.

Figure 22:
Figure 23:

FIGS. 22 and 23 illustrate various time signatures according to the present invention, and are self explanatory in the light of the preceding description of the invention.

FIGS. 23 and 24 illustrate how the home positions for the hands may vary during a piece of music.

FIG. 24 shows a piece of music 275 in which the initial home position for finger 1 of the right hand is on key $C_4$. In the second, third and fourth bars the home positions for finger 1 of the right hand change to $E_3$, $E_4$ and $G_3$ respectively. This is shown in the representation 276 according to the present invention by the symbols '$C_4$', '$E_3$', '$E_4$' and '$G_3$' numbered 277,278,279 and 280 respectively appearing on the begging beat of the first to fourth bars.

Similarly, the changes in the home positions for the right hand to play the piece of music 285 of FIG. 25 are shown by the symbols '$E_3$', '$C_4$', '$G_3$' and '$D_4$' in the representation according to the present invention at 286.

Figure 26:
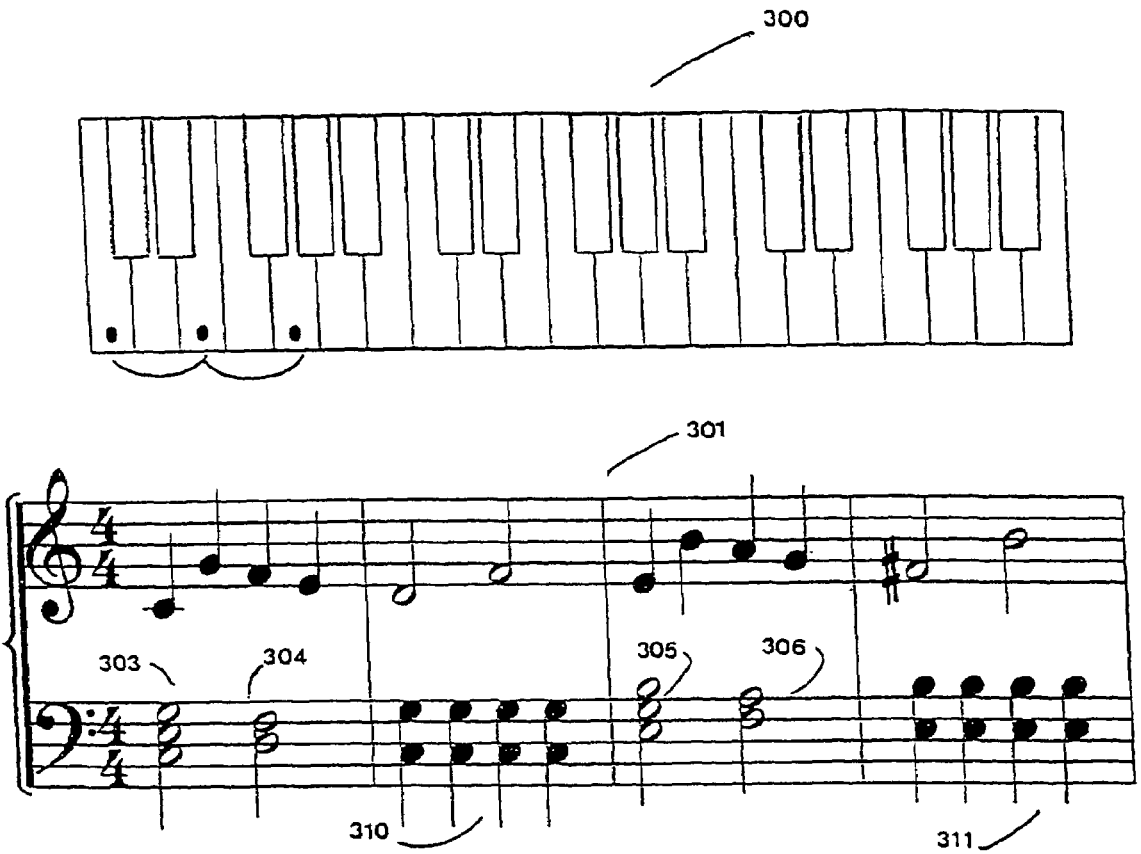

FIG. 26 shows how the keyboard technique of 'shifting' is represented according to the present invention.

The first and third bars of the piece of music 301 start with a chord (303 and 305 respectively) which is played by striking the home keys of the first, third and fifth fingers of the left hand. The second half of each bar is a chord (304 and 306 respectively) which is played with the fingers of the left hand which were not used to play the first bar. That is, to play the second bar, the second and fourth fingers of the left hand strike their home keys.

This alternation between the fingers of the hand is shown at 307 and 308 respectively in the representation 302 according to the present invention.

It can also be seen from FIG. 26 that the third bar of music is played with the same fingers as is the first bar of music; and that the fourth bar of music is played with the same fingers as is the second bar of music. However in each case the notes of the bars are two keys higher in pitch. This is indicated by the instructions for the right hand of 'RH 1 on $C_3$' for the first and second bars and 'RH 1 on $E_3$' for the third and fourth bars.

Similarly, the left hand is moved two key spaces higher in pitch between the second and third bars with the instructions 'LH 5 on $C_2$' and 'LH 1 on $E_2$'.

Figure 27:
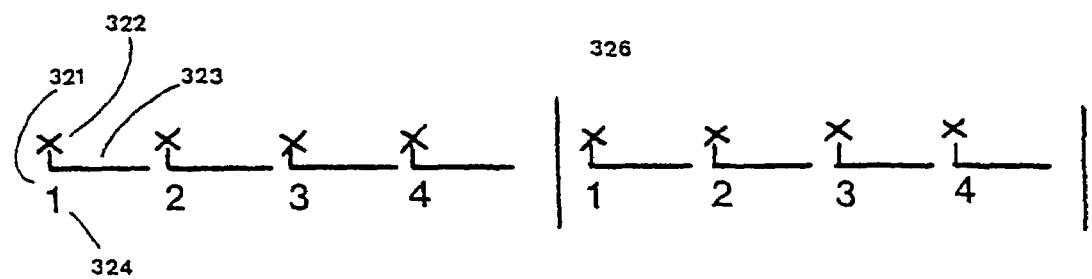
Figure 27:
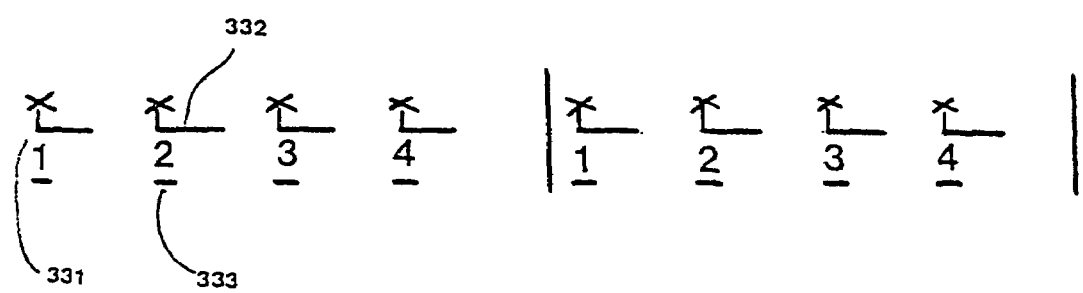
Figure 27:
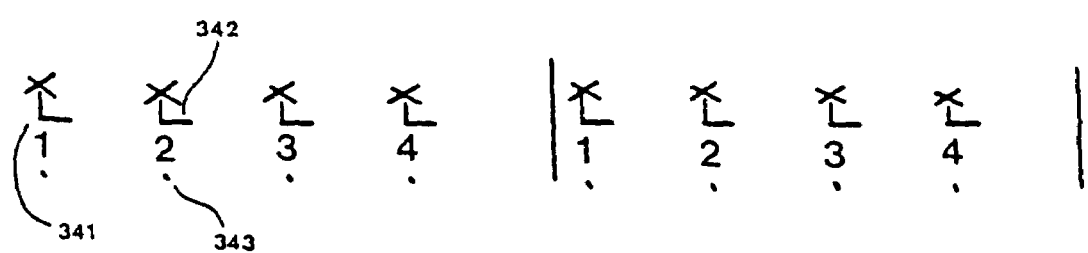

FIG. 27 illustrates alternative embodiments of the invention in which both the initiation and the duration of the sound of the notes may be specified.

The embodiment 321 includes the bar lines 326 and the finger numbers 324 as do the preceding embodiments. The present embodiment additionally includes beat point markers in the form of small crosses 322 which mark the beat point. In this embodiment, the length of the lines 326 indicate the duration of the note (or notes) within the beat.

The embodiment 331 of the present invention is for a piece of music which is played staccato, that is, in which each note sounds for half the duration of a beat interval. This is indicated by the lines 332 being half the usual length, and by the short line 333 appearing under each finger number.

The embodiment 341 of the present invention is for a piece of music which is played staccatissimo, that is, in which each note sounds for a quarter of the duration of a beat interval. This is indicated by the line 342 being one quarter of the usual length, and by the dot 343 appearing under each finger number.

The embodiment 351 of FIG. 27 is for a piece of music which is played mezzo-staccato, that is, in which each note sounds for three-quarters of the duration of a beat interval. This is indicated by the line 352 being three-quarters of the usual length, and by a dot 353 appearing under each finger number.

Figure 28:
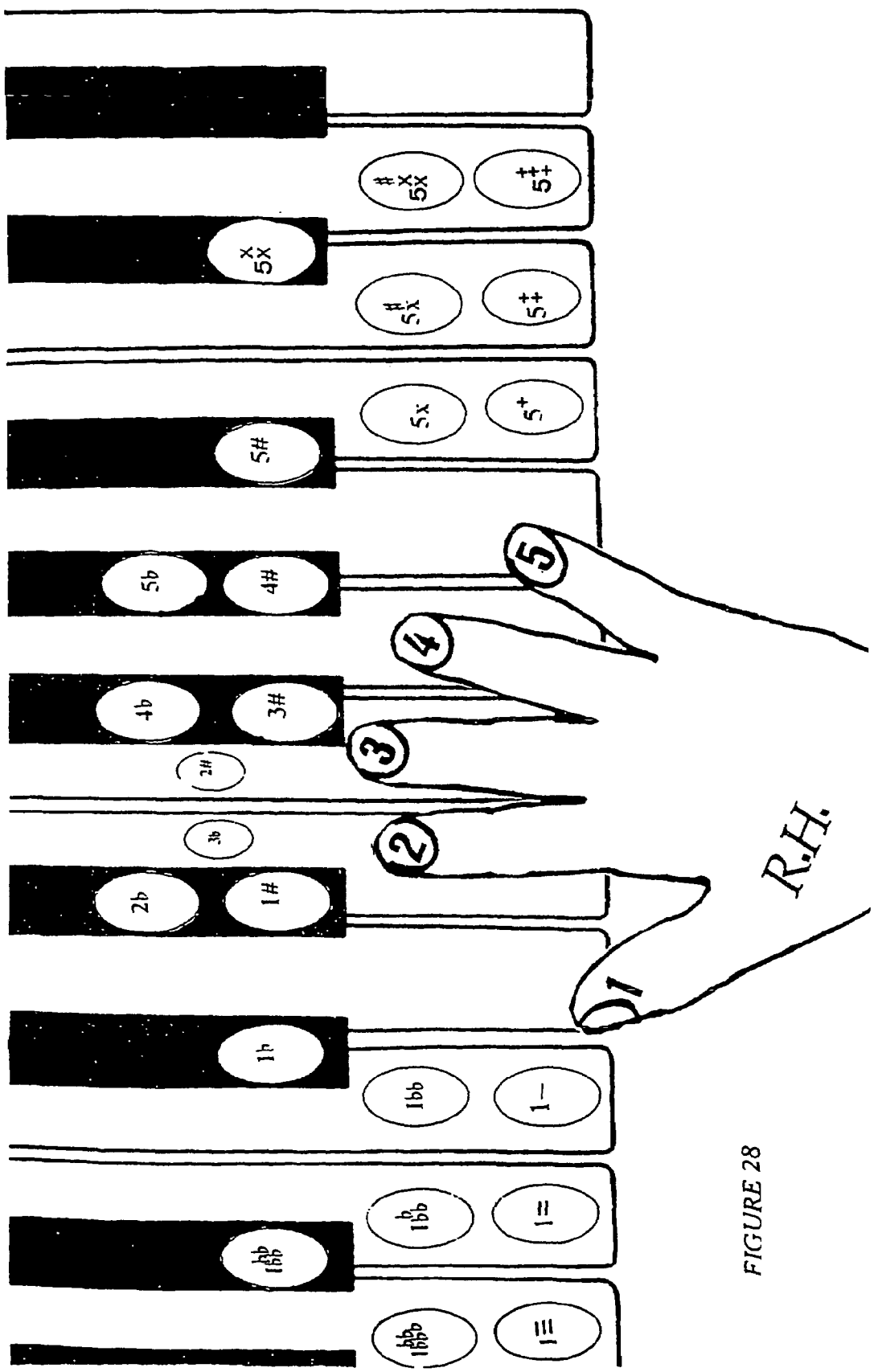
FIG. 28 is a graphical summary of some features of the notational system according to the present invention.

FIG. 28 summarises part of the notational system which is described in detail above by showing the fingers of the right hand placed relative to the keyboard, and shows the manner in which various keys of the keyboard would be designated relative to that hand position.

Figure 29:
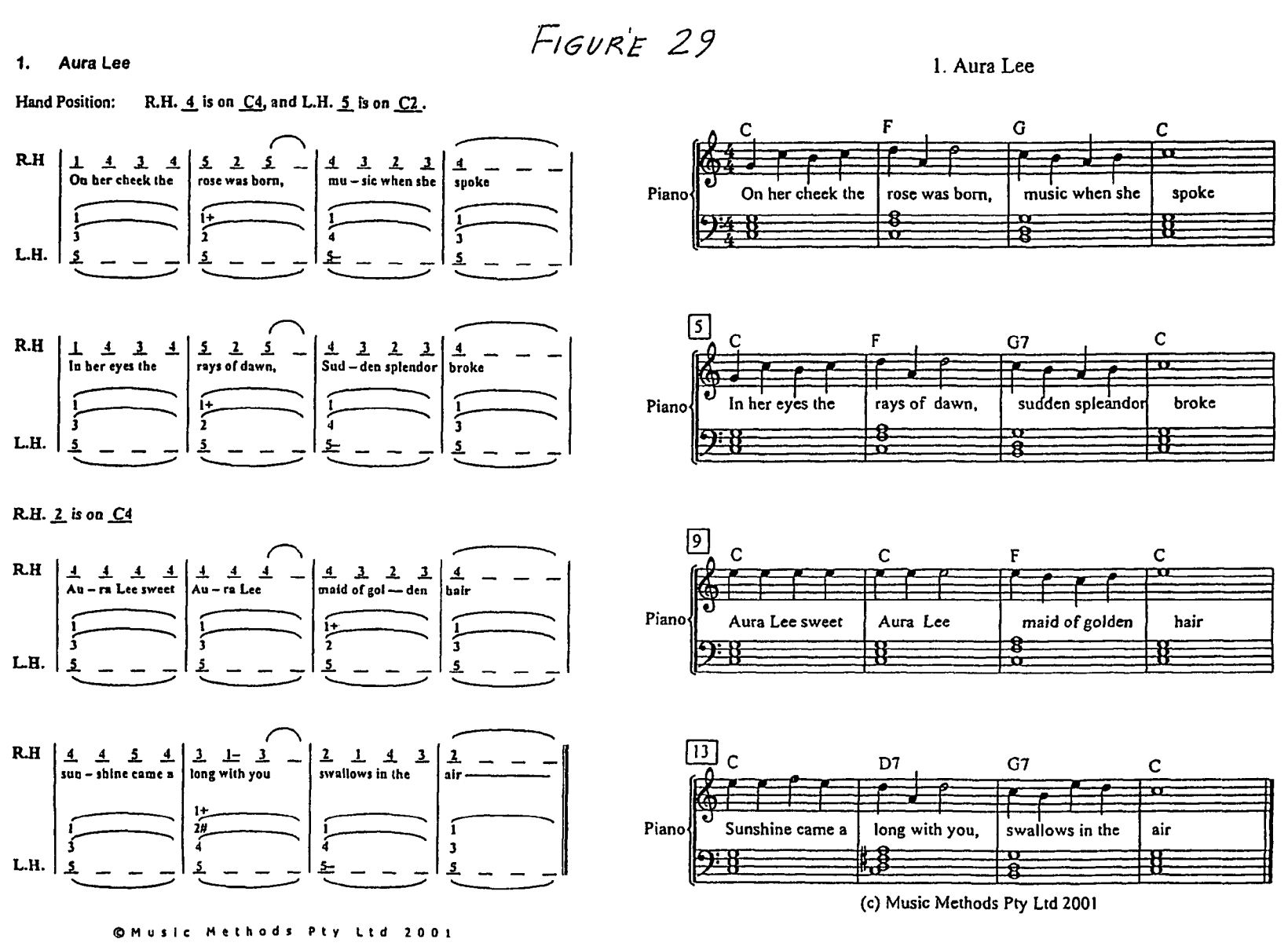

FIG. 29 shows the notation as presented to a learner with the corresponding conventional notation staff by staff on the LH and RH sides of a page.

I have found the advantages of the above example to be:
1. Concise presentation.
2. The notation mimics the traditional music notation in that it is read in lines from left to right.
3. More information is given than in traditional music notation.

The invention claimed is:

1. A musical notation for instructing a performer on the manual movements to make in playing a piece of music on an instrument, including the provision of at least one time line representing the passage of time during the piece and associated with a time line is a beat indicia which shows points in time of the time line and associated with each beat, indicia of which fingers, if any, are to play a note on the instrument without the representation of a keyboard, and wherein indicia show to the performer which keys are home keys where the performers rest the fingers when not playing a note and the indicia show the performer when to change the home keys during the piece of music.

2. A musical notation as claimed in claim 1, wherein two time lines provide in one corresponding to each hand of the performer.

3. A musical notation as claimed in claim 1 wherein the beginning of a bar is indicated by indicia.

4. A musical notation as claimed in claim 1 wherein indicia show the movement that a finger is to make to strike a key other than the home key for that finger.

5. A musical notation as claimed in claim 1 wherein indicia associated with a beat indicia indicate when each note is to be played relative to the beat indicia.

6. A musical notation as claimed in claim 1 wherein the notation is presented side by side with the corresponding traditional staves showing conventional musical notation.

7. A method of transcribing conventional stave data to the format of claim 1.

8. A musical notation for instructing a performer on the manual movements to make in playing a piece of music on an instrument, including the provision of at least one time line representing the passage of time during the piece and associated with a time line is a beat indicia which shows points in time of the time line and associated with each beat, indicia of which fingers, if any, are to play a note on the instrument without the representation of a keyboard, and wherein indicia show to the performer which keys are home keys where the performers rest the fingers when not playing a note and indicia show movement for the entire hand so that a finger strikes a key other than the home key for that finger and inicia show the movement for the entire hand so that the finger strikes a key other than the home 'C' key for that hand.

9. A musical notation as claimed in claim 8, wherein two time lines provide in one corresponding to each hand of the performer.

10. A musical notation as claimed in claim 8 wherein the beginning of a bar is indicated by indicia.

11. A musical notation as claimed in claim 8 wherein indicia associated with a beat indicia indicate when each note is to be played relative to the beat indicia.

12. A musical notation as claimed in claim 8 wherein the notation is presented side by side with the corresponding traditional staves showing conventional musical notation.

13. A method of transcribing convention stave data to the format of claim 8.

14. A musical notation for instructing a performer on the manual movements to make in playing a piece of music on an instrument, including the provision of at least one time line representing the passage of time during the piece and associated with a time line is a beat indicia which shows points in time of the time line and associated with each beat, indicia of which fingers, if any, are to play a note on the instrument without the representation of a keyboard, and wherein the indicia show the length of each note expressed by one or more hyphens between a pair of bar lines and a series of numbers 1 to 5 corresponding to the fingers placed side by side between the same bar lines.

15. A musical notation as claimed in claim 14, wherein two time lines provide in one corresponding to each hand of the performer.

16. A musical notation as claimed in claim 14 wherein the beginning of a bar is indicated by indicia.

17. A musical notation as claimed in claim 14 wherein indicia associated with a beat indicia indicate when each note is to be played relative to the beat indicia.

18. A musical notation as claimed in claim 14 wherein the notation is presented side by side with the corresponding traditional staves showing conventional musical notation.

19. A method of transcribing convention stave data to the format of claim 14.

* * * * *